United States Patent
Suzuki

(10) Patent No.: US 9,030,378 B2
(45) Date of Patent: May 12, 2015

(54) SHARING DISPLAY PROCESSING SYSTEM, DISPLAY PROCESSING SYSTEM, AND DISPLAY METHOD

(75) Inventor: Takeshi Suzuki, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1352 days.

(21) Appl. No.: 12/502,083

(22) Filed: Jul. 13, 2009

(65) Prior Publication Data

US 2010/0020086 A1    Jan. 28, 2010

(30) Foreign Application Priority Data

Jul. 22, 2008  (JP) .................................. 2008-189040

(51) Int. Cl.
G09G 5/00    (2006.01)
G06F 15/167    (2006.01)
G06F 3/14    (2006.01)

(52) U.S. Cl.
CPC ....................................... *G06F 3/14* (2013.01)

(58) Field of Classification Search
CPC .................................................. G06F 3/1454
USPC ............... 345/1.1, 2.1, 2.2, 3.1, 3.3, 3.4, 530, 345/536, 537, 541; 709/213
See application file for complete search history.

(56) References Cited

U.S. PATENT DOCUMENTS 4,479,195 A * 10/1984 Herr et al. ..................... 709/204
5,996,002 A * 11/1999 Katsurabayashi et al. .... 709/204
7,557,774 B2 * 7/2009 Baudisch et al. .............. 345/1.1

FOREIGN PATENT DOCUMENTS

JP          07-129357          5/1995

* cited by examiner

*Primary Examiner* — Joni Richer
(74) *Attorney, Agent, or Firm* — Cowan, Liebowitz & Latman, P.C.

(57) ABSTRACT

In a sharing display processing system having a plurality of display processing systems each including one or a plurality of display apparatuses, each display processing system arranges display regions corresponding to the respective display apparatuses on a first memory region shared with another display processing system, arranges contents on a second memory region managed by the self system, extracts a part of the second memory region on which the contents are arranged as an extracted region, and arranges the extracted region on the first memory region. Each display apparatus displays the extracted region arranged within the range of the display region corresponding to itself on the first memory region.

14 Claims, 15 Drawing Sheets

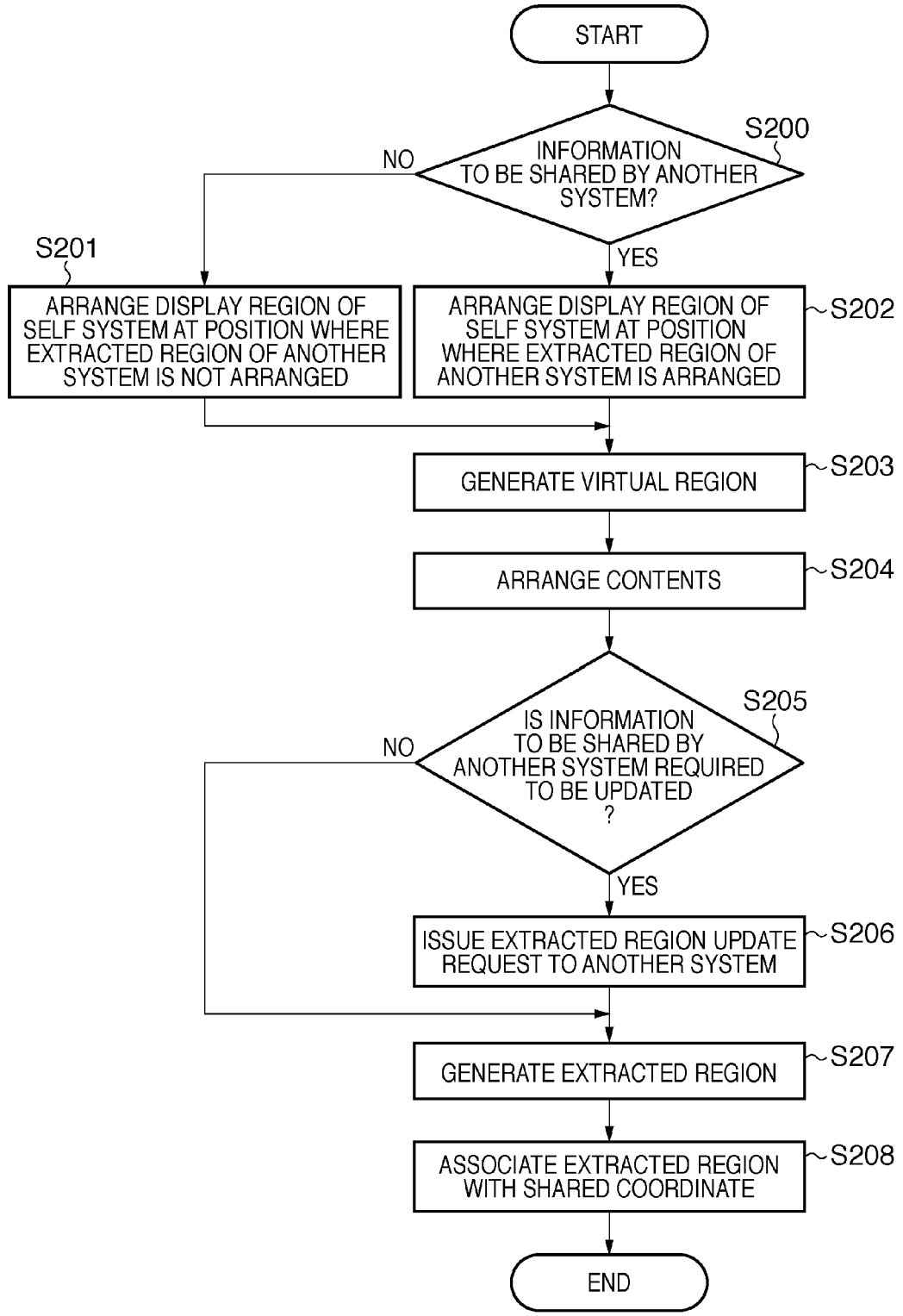

SHARING DISPLAY PROCESSING SYSTEM, DISPLAY PROCESSING SYSTEM, AND DISPLAY METHOD

BACKGROUND OF THE INVENTION

1. Field of the Invention

The present invention relates to a technique for displaying a plurality of contents on a plurality of display apparatuses.

2. Description of the Related Art

Conventionally, when a plurality of contents are to be displayed on a plurality of display apparatuses, a specific virtual region is created within one system, and a plurality of image contents are arranged on the created virtual region. Then, a region having the same size as a display apparatus is extracted from the virtual region after the arrangement, and is displayed on the display apparatus.

As such a system, a system disclosed in Japanese Patent Laid-Open No. 7-129357 is known. In this system, a virtual space is provided to a CPU having a graphic output function, and a display space corresponding to a display unit is arranged and managed on a logical output space of that virtual space.

However, in the aforementioned related art, since the CPU having the graphic output function manages the virtual space, the number of contents that can be displayed and the number of display devices are limited due to hardware restrictions. For example, it is difficult to share contents and display apparatuses between a plurality of systems.

SUMMARY OF THE INVENTION

The present invention provides a technique which allows a plurality of systems to easily share display apparatuses and contents.

According to a first aspect of the present invention there is provided a sharing display processing system having a plurality of display processing systems each comprising one or a plurality of display apparatuses, wherein each display processing system comprises: a display region arrangement unit configured to arrange display regions corresponding to the respective display apparatuses on a first memory region shared with another display processing system; a content arrangement unit configured to arrange contents on a second memory region managed by the self system; an extraction unit configured to extract a part of the second memory region, on which the contents are arranged by the content arrangement unit, as an extracted region; and an extracted region arrangement unit configured to arrange the extracted region extracted by the extraction unit on the first memory region, and each display apparatus displays the extracted region arranged within a range of the display region corresponding to itself on the first memory region.

According to a second aspect of the present invention there is provided a display processing system including one or a plurality of display apparatuses, comprising: a display region arrangement unit configured to arrange display regions corresponding to the respective display apparatuses on a first memory region shared with another display processing system; a content arrangement unit configured to arrange contents on a second memory region managed by the self system; an extraction unit configured to extract a part of the second memory region, on which the contents are arranged by the content arrangement unit, as an extracted region; and an extracted region arrangement unit configured to arrange the extracted region extracted by the extraction unit on the first memory region, wherein each display apparatus displays the extracted region arranged within a range of the display region corresponding to itself on the first memory region.

According to a third aspect of the present invention there is provided a display method in a sharing display processing system having a plurality of display processing systems each comprising one or a plurality of display apparatuses, wherein each display processing system includes: arranging display regions corresponding to the respective display apparatuses on a first memory region shared with another display processing system; arranging contents on a second memory region managed by the self system; extracting a part of the second memory region, on which the contents are arranged in the arranging the contents, as an extracted region; and arranging the extracted region extracted in the extracting on the first memory region, and each display apparatus displays the extracted region arranged within a range of the display region corresponding to itself on the first memory region.

Further features of the present invention will become apparent from the following description of exemplary embodiments with reference to the attached drawings.

BRIEF DESCRIPTION OF THE DRAWINGS

FIG. 15 is a flowchart showing the sequence of processing in the video conference system shown in FIG. 12.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
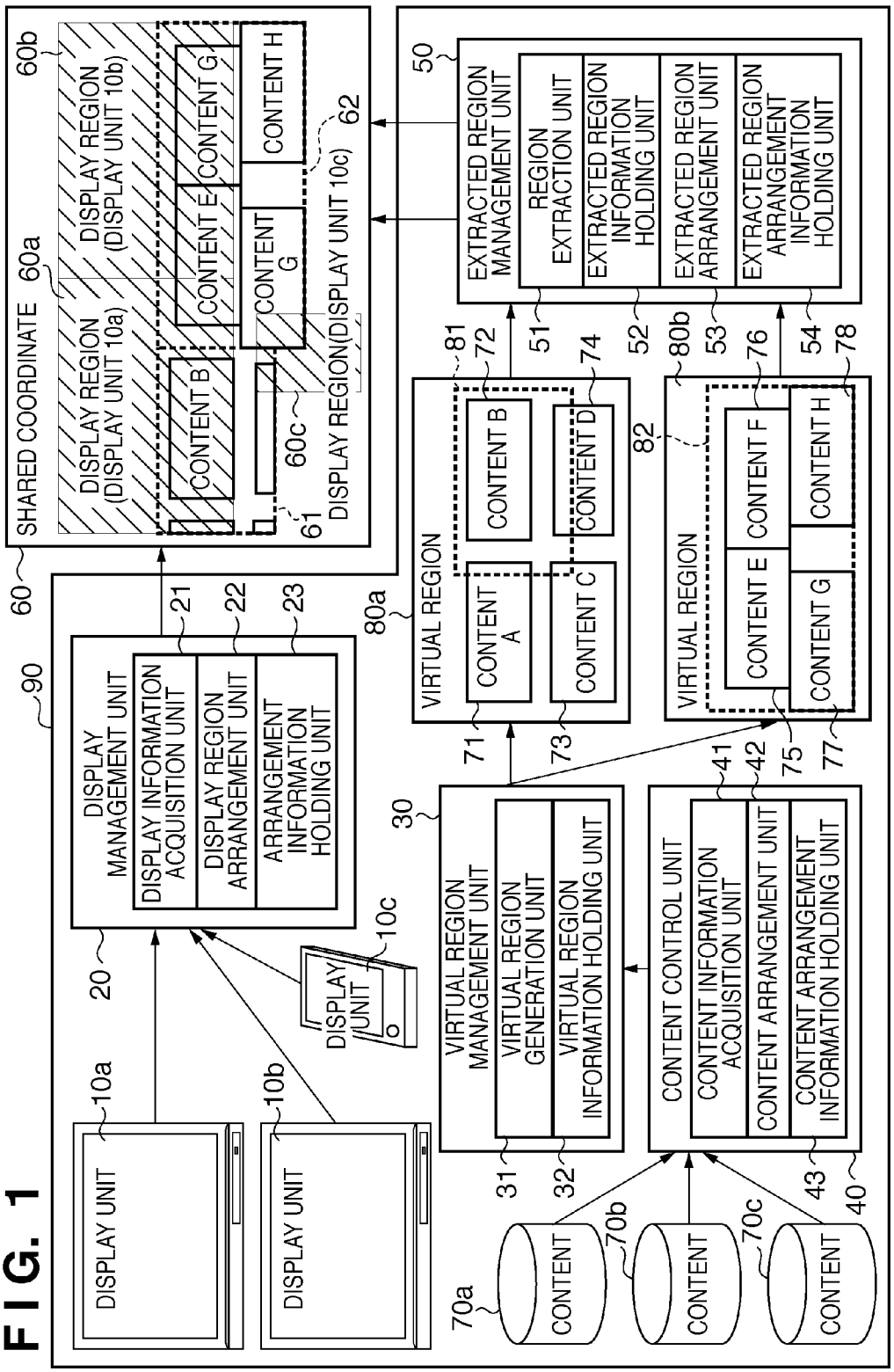
FIG. 1 is a block diagram showing the arrangement of a sharing display processing system according to an embodiment of the present invention.

FIG. 1 is a block diagram showing an example of the arrangement of a sharing display processing system according to an embodiment of the present invention.

The sharing display processing system includes one or a plurality of computers. Each computer includes, for example, a main control unit such as a CPU, and a storage unit such as a ROM (Read Only Memory) and RAM (Random Access Memory). The computer may also include a communication unit such as a network card, and input and output units such as a keyboard and a display or touch panel. Note that these units are connected via a bus and the like, and are controlled when the main control unit executes programs stored in the storage unit.

The sharing display processing system includes one or a plurality of display processing systems 90 (one system in this case). In the sharing display processing system, contents managed by each display processing system 90 can be displayed on a plurality of display apparatuses (display units) provided to each display processing system 90. Note that contents are digital data including a wide variety of document (text), music, image, and video data.

The display processing system 90 includes, as its functional arrangement, a display unit 10, display management unit 20, virtual region management unit 30, content control unit 40, and extracted region management unit 50. Note that the display processing system 90 includes one or a plurality of computers as in the aforementioned sharing display processing system.

A plurality of (three in this case) display units 10, that is, 10a, 10b, and 10c are included. The display units 10 include, for example, Full-HD liquid crystal displays having a resolution of 1920×1080, a PDA (Personal Display Assistant). Note that the number of display units 10 is not limited to three, and an arbitrary number of display units 10 may be included.

The display management unit 20 manages the display units 10. The display management unit 20 includes a display information acquisition unit 21, display region arrangement unit 22, and arrangement information holding unit 23. The display information acquisition unit 21 acquires display size information (e.g., a resolution) from each of the display units 10. The display region arrangement unit 22 arranges display regions 60a, 60b, and 60c on a shared coordinate 60 corresponding to the respective display units 10 based on the acquired information. The arrangement information holding unit 23 holds display region arrangement information associated with the arranged display regions. Note that the shared coordinate (first memory region) 60 is a logical coordinate space independent from the sizes of the display regions of the display units 10, and is shared and used between the plurality of display units 10 and a plurality of display processing systems. Since the shared coordinate 60 does not depend on the sizes of the display regions of the display units 10, a region having a size of, for example, 1M×1M pixels can be set.

Figure 2:
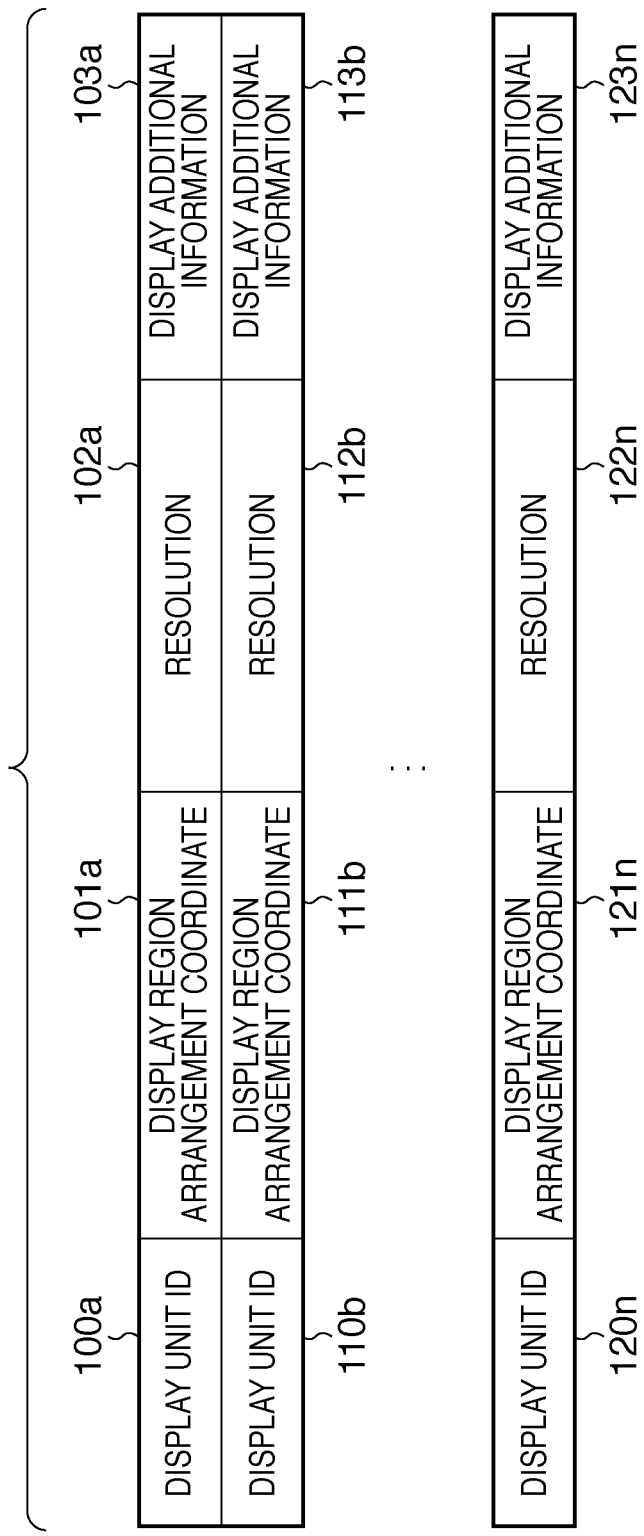
FIG. 2 is a view showing an example of display region arrangement information held in an arrangement information holding unit 23 shown in FIG. 1.

FIG. 2 shows an example of the display region arrangement information held in the arrangement information holding unit 23.

The display region arrangement information is held in correspondence with each of display IDs 100a to 120n used to identify the display units 10. In correspondence with these display IDs 100a to 120n, display region arrangement coordinates 101a to 121n, resolutions 102a to 122n, and pieces of display additional information 103a to 123n are held. Each of the pieces of display additional information 103a to 123n is additional information associated with each display unit 10, and holds, for example, color space information.

The virtual region management unit 30 generates and manages a virtual region (second memory region). The virtual region management unit 30 includes a virtual region generation unit 31 and virtual region information holding unit 32. The virtual region generation unit 31 generates virtual regions 80, that is, 80a and 80b. The virtual region 80 is a virtual space independent from the size of the display unit 10 or that of each content 70, that is, 70a, 70b, or 70c. The virtual region information holding unit 32 holds size information (e.g., a size) of each virtual region generated by the virtual region generation unit 31.

The content control unit 40 controls a plurality of contents 70, that is, 70a, 70b, and 70c. The content control unit 40 includes a content information acquisition unit 41, content arrangement unit 42, and content arrangement information holding unit 43. The content information acquisition unit 41 acquires information associated with a content such as the size and color space of the content, and the content itself. The content arrangement unit 42 arranges contents on virtual regions 80, that is, 80a and 80b based on the acquired information. The content arrangement information holding unit 43 holds content arrangement information associated with each content arranged on the virtual region 80, that is, 80a or 80b. In case of FIG. 1, contents A 71 to D 74 are arranged on the virtual region 80a, and contents E 75 to H 78 are arranged on the virtual region 80b.

Figure 3:
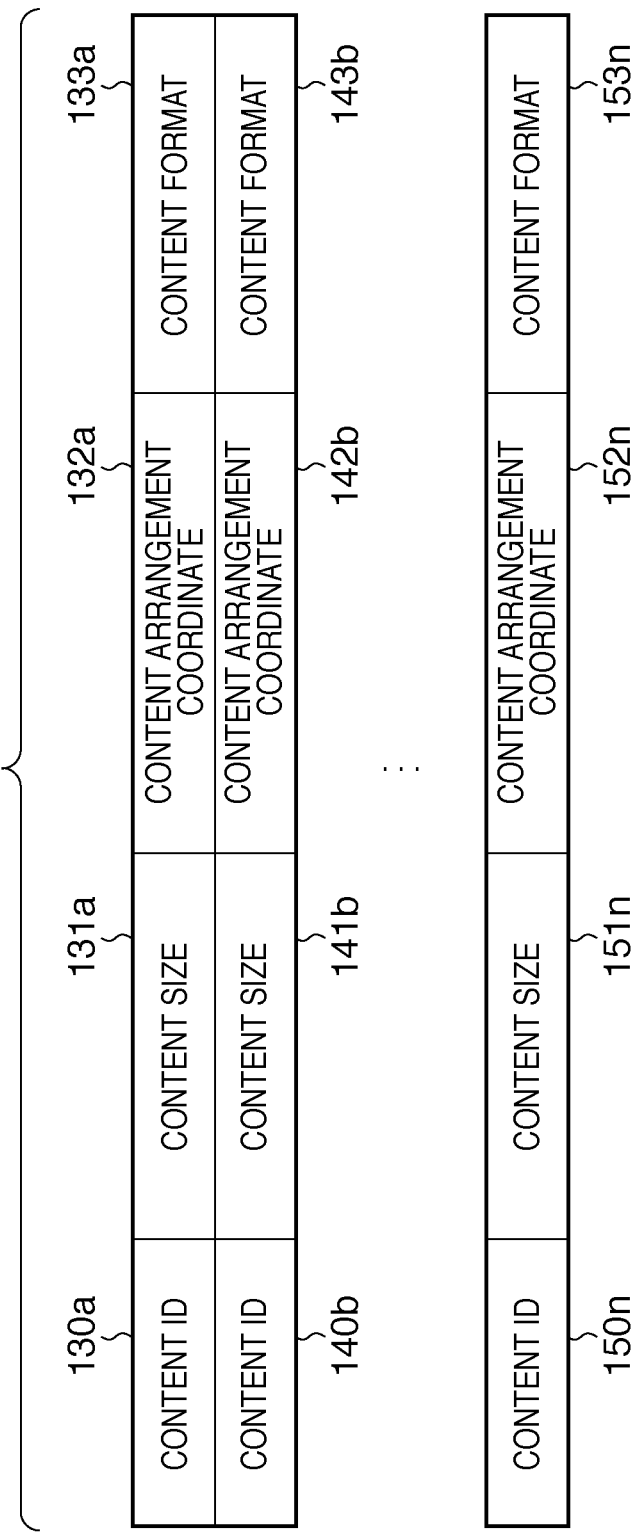
FIG. 3 is a view showing an example of content arrangement information held in a content arrangement information holding unit 43 shown in FIG. 1.

FIG. 3 shows an example of the content arrangement information held in the content arrangement information holding unit 43.

The content arrangement information is held in correspondence with each of content IDs 130a to 150n used to identify the respective contents. In correspondence with these contents IDs 130a to 150n, content sizes 131a to 151n, content arrangement coordinates 132a to 152n, and content formats 133a to 153n are held.

The extracted region management unit 50 extracts a region having an arbitrary position and arbitrary size on each virtual region 80, that is, 80a or 80b from that region, and manages the extracted region. The extracted region management unit 50 includes a region extraction unit 51, extracted region information holding unit 52, extracted region arrangement unit 53, and extracted region arrangement information holding unit 54.

The region extraction unit 51 decides a position and size of a region extracted from each virtual region 80, that is, 80a or 80b, and extracts the decided region (to be referred to as an extracted region hereinafter). The extracted region information holding unit 52 holds information (for example, a position and size) associated with the extracted region. The extracted region arrangement unit 53 arranges the extracted region on the shared coordinate 60. The extracted region arrangement information holding unit 54 holds extracted region arrangement information associated with the arranged extracted region. In case of FIG. 1, regions 81 and 82 are extracted from portions of the virtual regions 80, that is, 80a and 80b and are arranged on predetermined regions 61 and 62 on the shared coordinate 60. On the shared coordinate 60, a content arranged within an extracted region arranged at a position corresponding to a display region is displayed on the display unit corresponding to that display region. For example, in case of FIG. 1, if the region 60a is a display region corresponding to the display unit 10a, the display unit 10a displays information including at least content B. Also, for example, if the region 60b is a display region corresponding to the display unit 10b, the display unit 10b displays information including at least portions of contents E and F.

Figure 4:
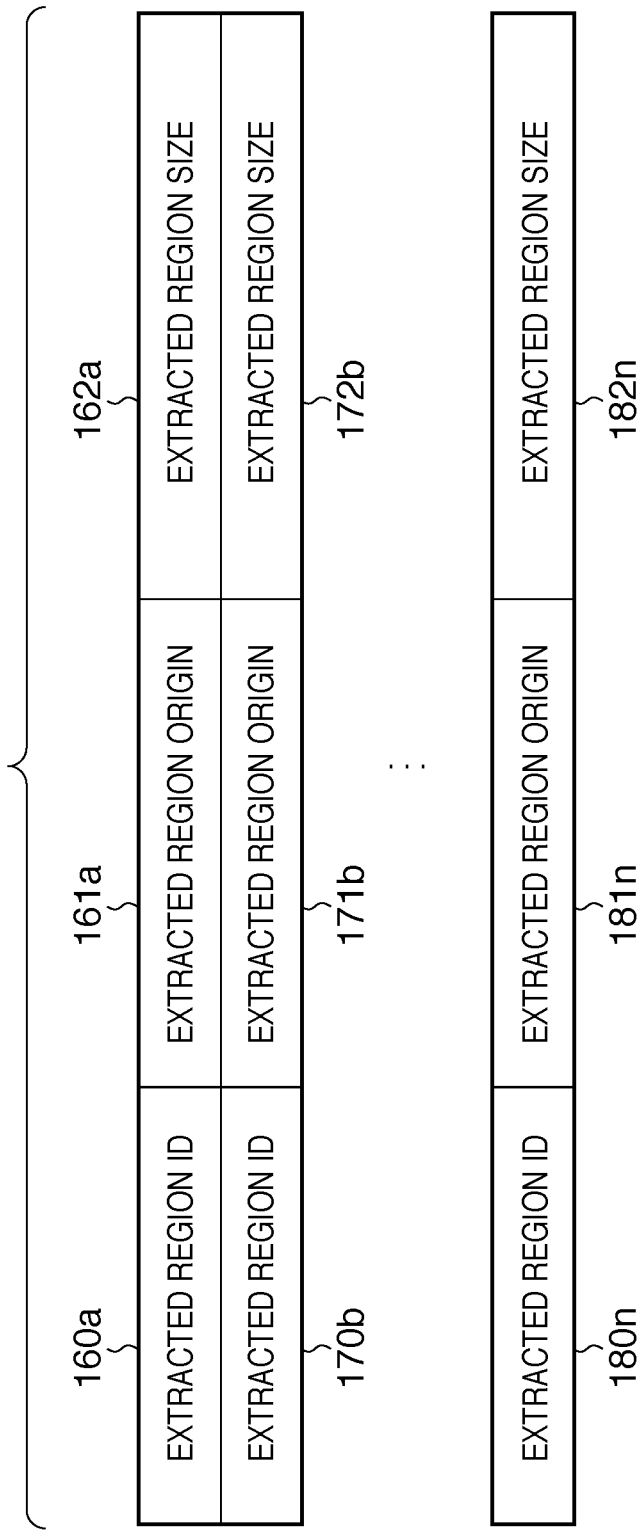
FIG. 4 is a view showing an example of extracted region arrangement information held in an extracted region arrangement information holding unit 54 shown in FIG. 1.

FIG. 4 shows an example of the extracted region arrangement information held in the extracted region arrangement information holding unit 54.

The extracted region arrangement information is held in correspondence with each of extracted region IDs 160a to 180n used to identify respective extracted regions. In correspondence with these extracted region IDs 160a to 180n, extracted region origins 161a to 181n and extracted region sizes 162a to 182n are held.

Figure 5:
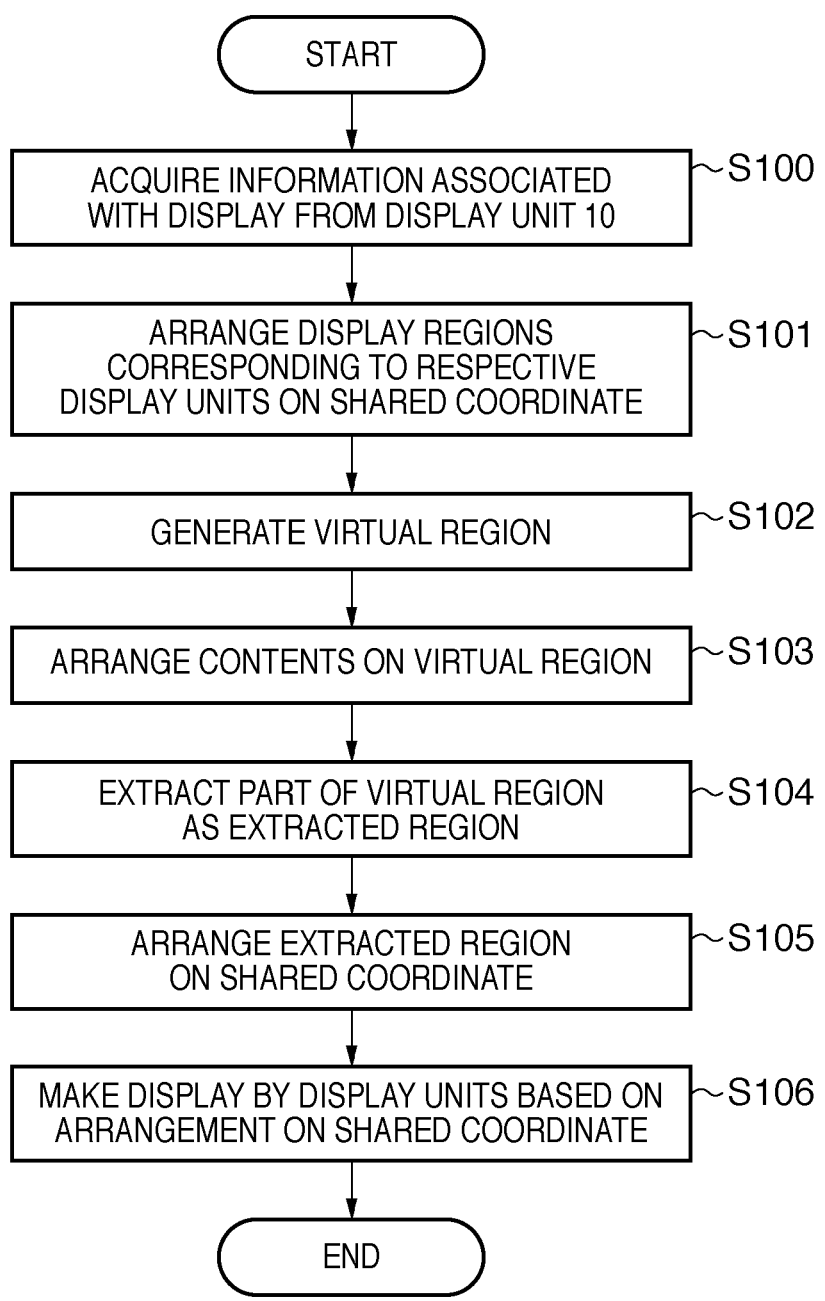
FIG. 5 is a flowchart showing an example of the sequence of processing in the sharing display processing system shown in FIG. 1.

An example of the sequence of processing in the sharing display processing system shown in FIG. 1 will be described below with reference to FIG. 5. In this case, the sequence of processing upon displaying the contents 70 of the display processing system 90 on the display units 10 included in this system will be described.

Figure 6:
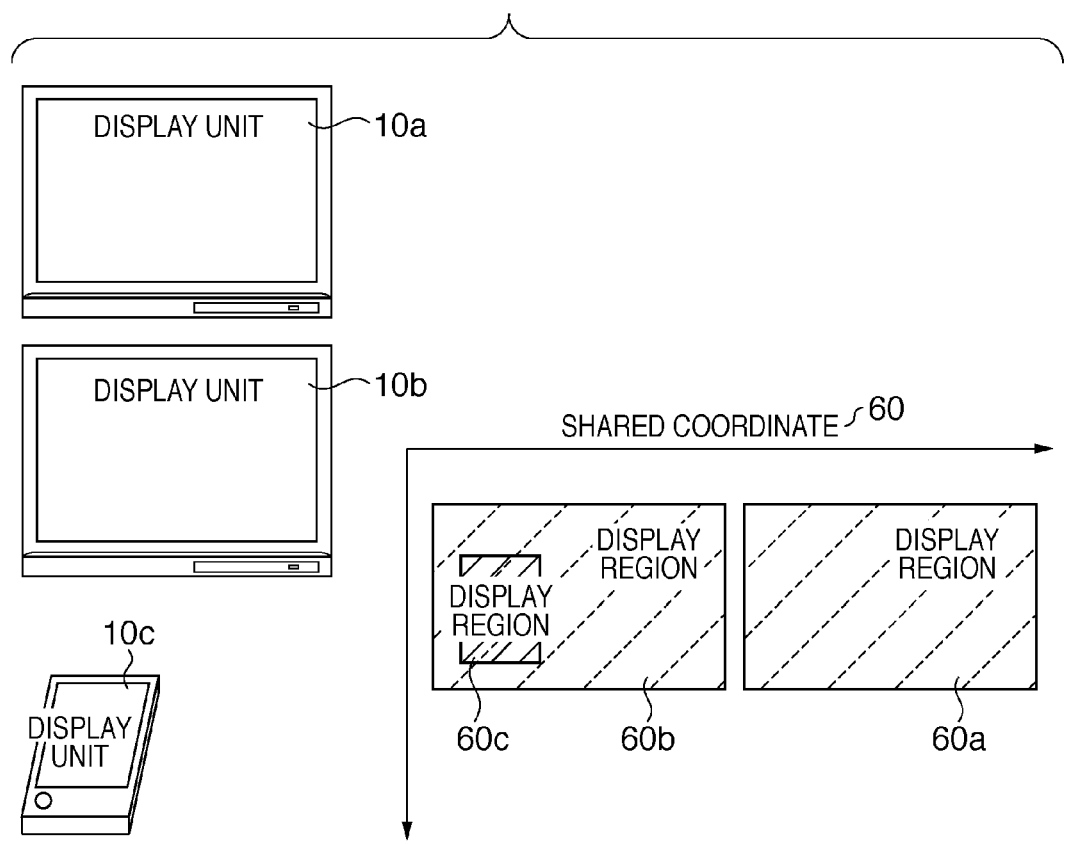
FIG. 6 is a view showing an overview of processing for arranging display regions on a shared coordinate.

When this processing starts, the display processing system 90 causes the display management unit 20 to acquire display size information from each of the display units 10 (S100), and to arrange display regions corresponding to the respective display units 10 on the first memory region, that is, on the shared coordinate 60 (S101). With this processing, as shown in FIG. 6, the display regions corresponding to the respective display units 10 are respectively associated with the shared coordinate 60. On the shared coordinate 60 shown in FIG. 6, reference numeral 60a denotes a display region corresponding to the display unit 10a; 60b, a display region corresponding to the display unit 10b, and 60c, a display region corresponding to the display unit 10c. Note that in FIG. 6, the display regions 60b and 60c are arranged to overlap the arrangement positions of each others' display regions. However, such arrangement of the display regions is allowed since the display regions can be independently arranged irrespective of the sizes and arrangement positions of the display units 10.

The display processing system 90 then causes the virtual region management unit 30 to generate second memory regions, that is, the virtual regions 80, that is, 80a and 80b (S102). The display processing system 90 causes the content control unit 40 to arrange contents on the second memory regions, that is, the virtual regions 80, that is, 80a and 80b (S103).

Figure 7A:
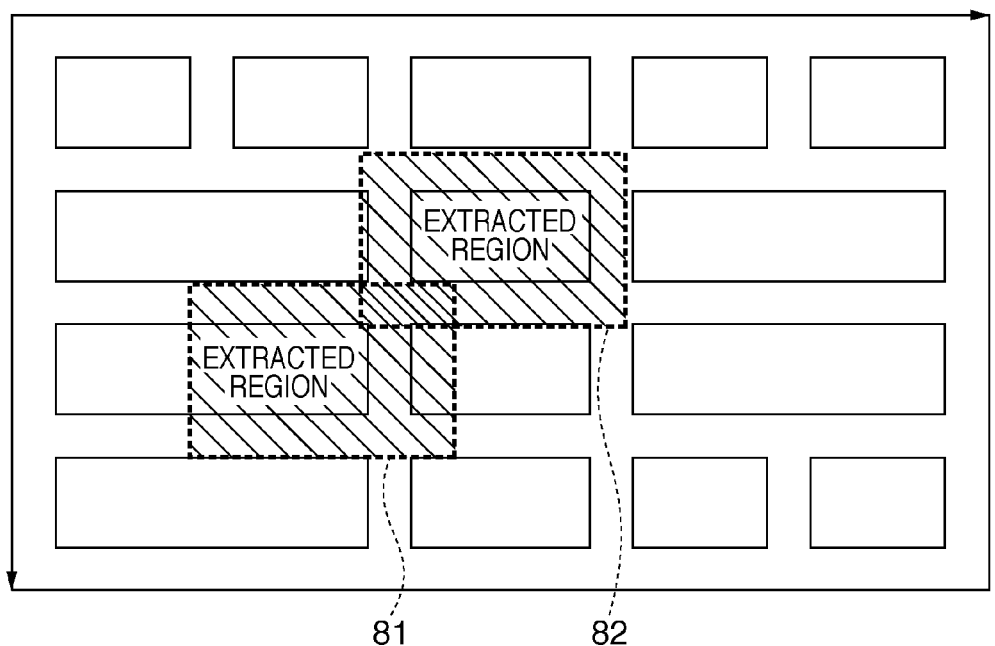
FIGS. 7A and 7B are views showing an overview of processing for extracting regions from a virtual region.
Figure 7B:
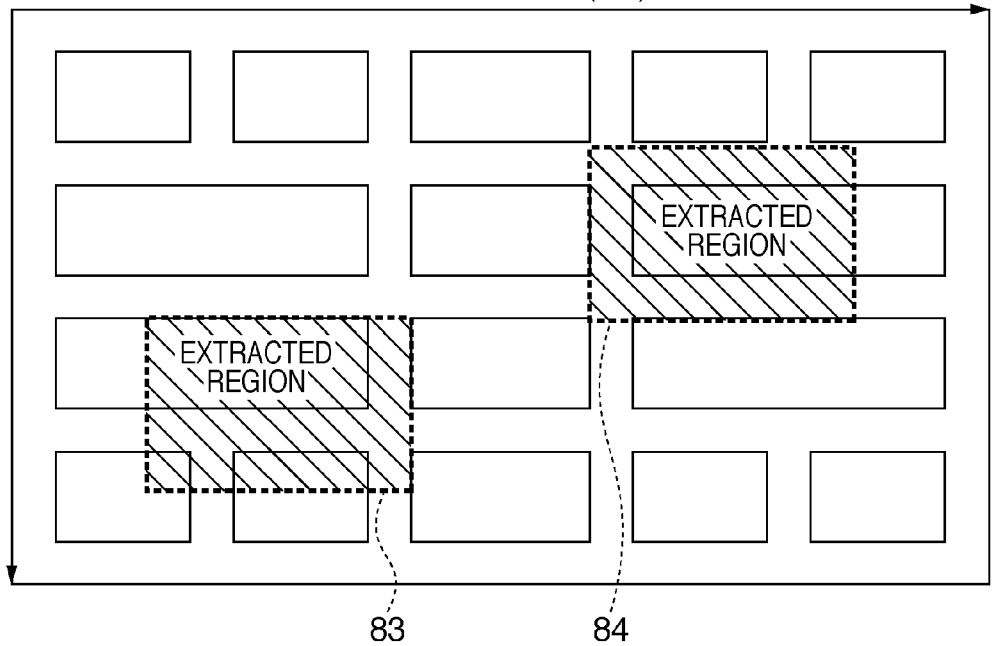

After the virtual regions 80, that is, 80a and 80b on which the contents are arranged are generated in this way, the display processing system 90 causes the extracted region management unit 50 to extract portions of the virtual regions 80 as extracted regions (S104). With this processing, arbitrary regions on the virtual regions 80 are extracted as extracted regions, as shown in FIGS. 7A and 7B. In case of FIGS. 7A and 7B, extracted regions 81, 82, 83, and 84 are extracted from the virtual regions 80, that is, 80a and 80b.

Upon completion of extraction of the regions, the display processing system 90 causes the extracted region management unit 50 to arrange the extracted regions on the shared coordinate 60 (S105). Hence, the extracted regions are associated with the shared coordinate 60, and the display units 10 display the extracted regions arranged within the ranges of the display regions corresponding to themselves on the shared coordinate 60 (S106).

Figure 8:
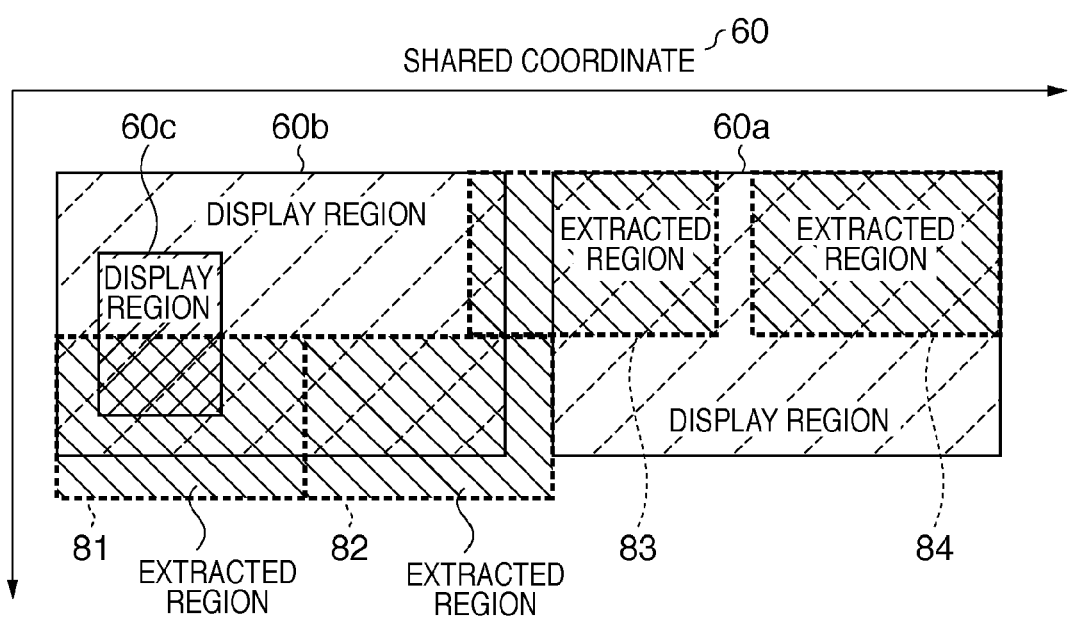
FIG. 8 is a view showing an overview of processing for associating display regions and extracted regions with the shared coordinate.

FIG. 8 shows an aspect in which the display regions explained using FIG. 6 and the extracted regions described using FIGS. 7A and 7B are associated with each other on the shared coordinate 60. In this case, the display unit 10a (corresponding to the display region 60a) displays a part of the extracted region 83 and the extracted region 84. The display unit 10b (corresponding to the display region 60b) displays a part of the extracted region 81, a part of the extracted region 82, and a part of the extracted region 83. Also, the display unit 10c (corresponding to the display region 60c) displays a part of the extracted region 81.

As described above, according to the first embodiment, the virtual regions 80 which do not depend on the display regions of the display units 10 are generated, and the contents 70 are arranged on these virtual regions 80. Arbitrary regions (extracted regions) are extracted from the virtual regions 80, and are associated with the shared coordinate 60, which is shared between the plurality of display units 10 and between the plurality of systems. After that, arbitrary regions (display regions) on the shared coordinate 60 with which the extracted regions are associated are assigned as the display regions of the display units 10, and the plurality of display units 10 display the plurality of contents 70. That is, a plurality of display apparatuses respectively display a plurality of contents using the shared coordinate 60 and virtual regions 80. As a result, the plurality of contents 70 can be shared and displayed by the plurality of display units 10 included in each of the plurality of systems.

Second Embodiment

The second embodiment will be described below. The second embodiment will explain a case in which the sharing display processing system described in the first embodiment is applied to a video conference system.

Figure 9:
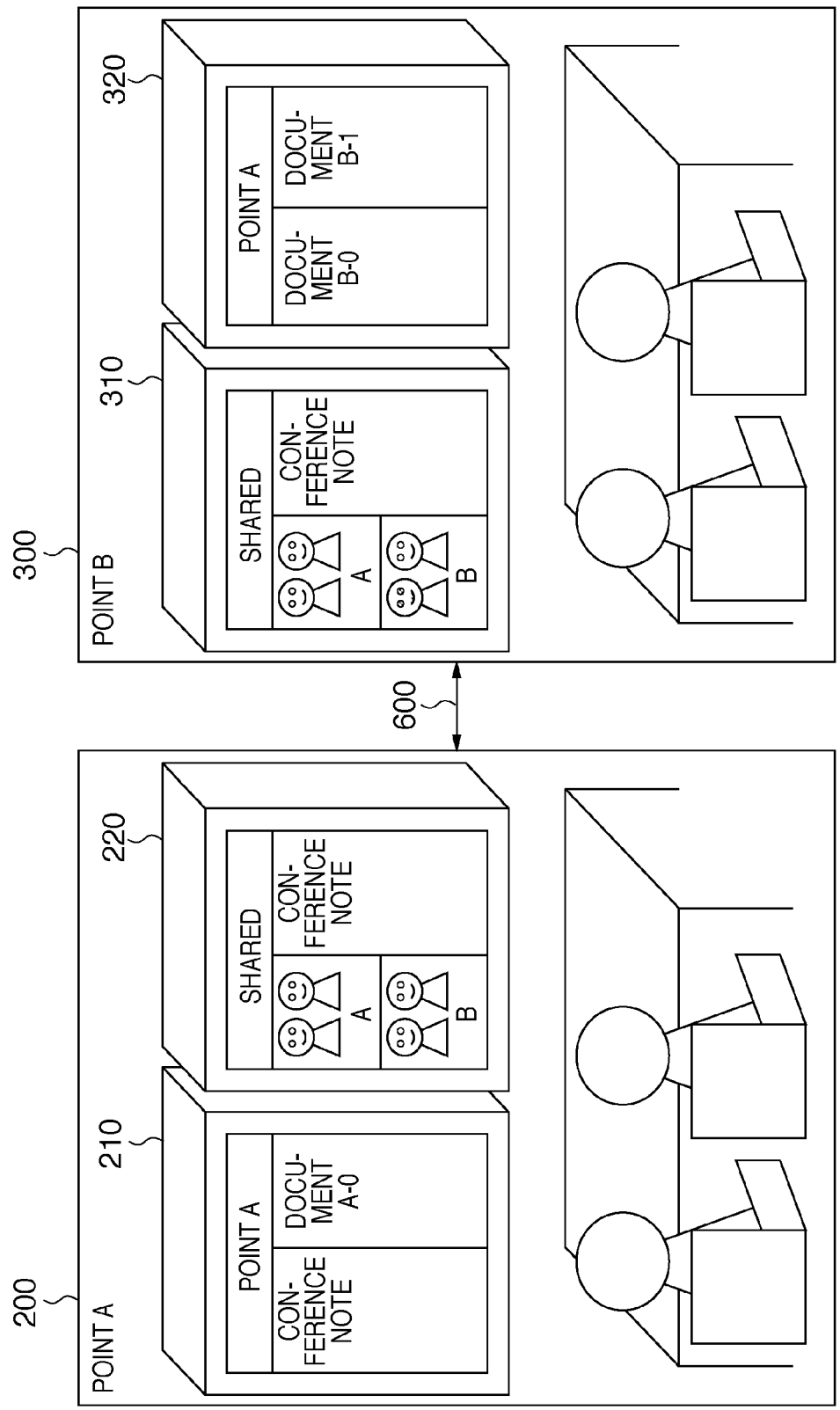
FIG. 9 is a first view showing an example of a video conference system.

FIG. 9 shows an overview of a video conference system in which two points, that is, a point A 200 and point B 300 are connected via a network 600. Each of the point A 200 and point B 300 includes the display processing system described in the first embodiment. In the point A 200, display units 210 and 220 are arranged. In the point B 300, display units 310 and 320 are arranged.

Figure 10:
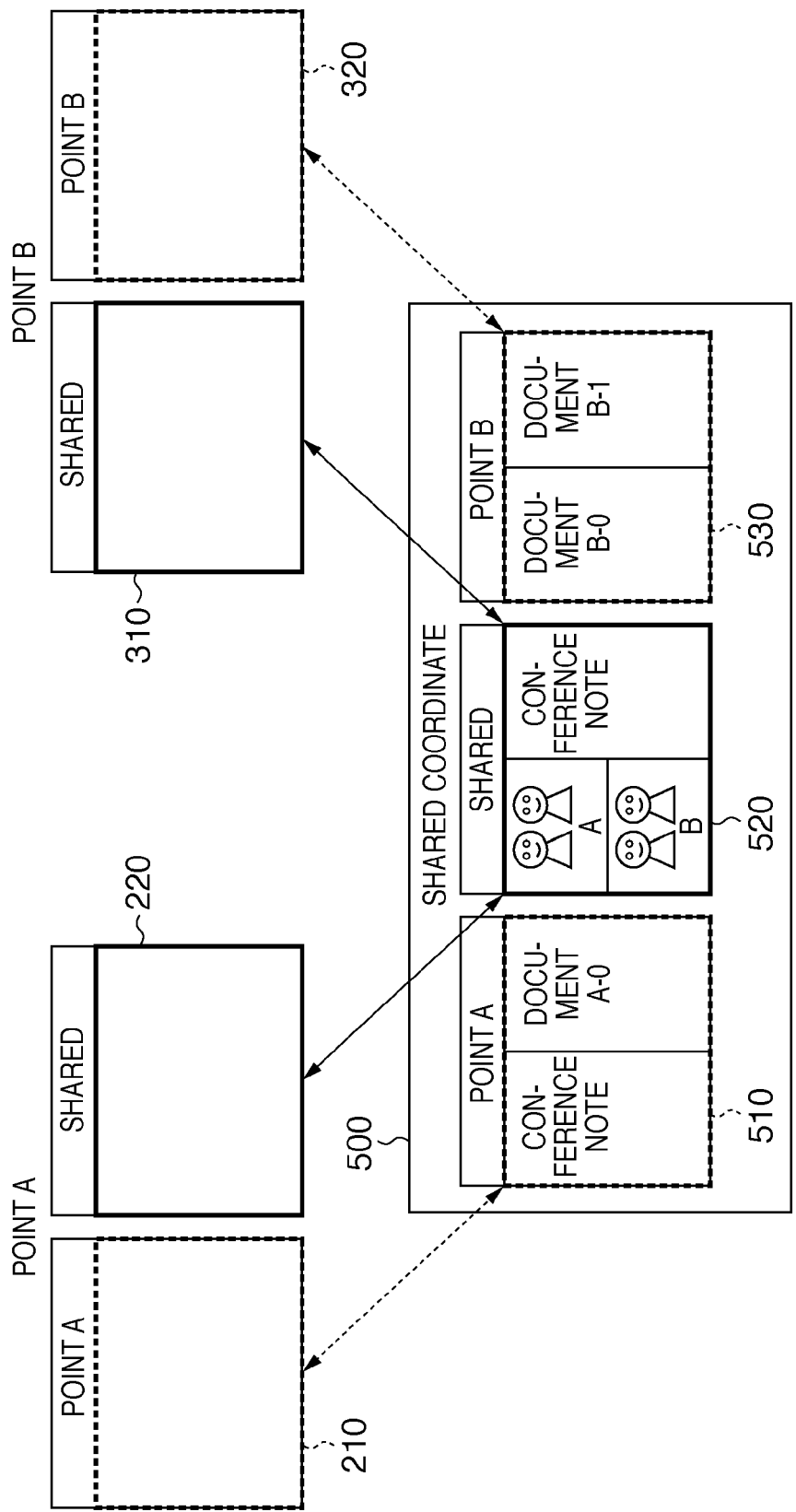
FIG. 10 is a first view showing an example of the relationship between a plurality of display units and the shared coordinate.

FIG. 10 is a view showing an example of the relationship between the plurality of display units 210, 220, 310, and 320 shown in FIG. 9, and a shared coordinate 500.

Reference numeral 500 denotes a shared coordinate shared between the plurality of display units and a plurality of systems (the points A and B in this case); and 510, 520, and 530, the coordinates (display regions) of the respective display units on the shared coordinate 500. In FIG. 10, the display region 520 includes display information shared between the points, and corresponds to the display units 220 and 310 of the point A 200 and point B 300. The display region 510 includes display information unique to the point A 200, and corresponds to the display unit 210. The display region 530 includes display information unique to the point B 300, and corresponds to the display unit 320.

Figure 11:
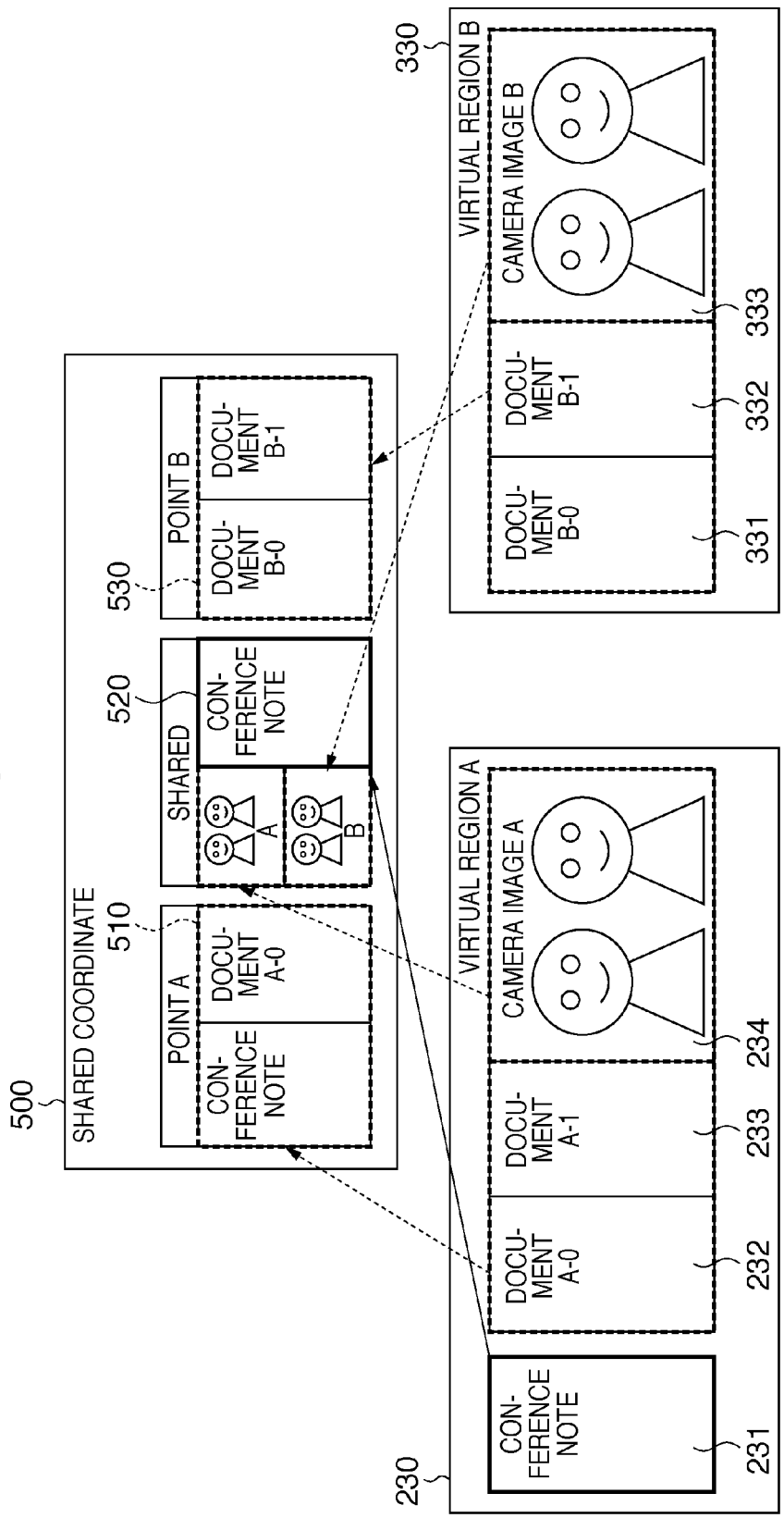
FIG. 11 is a first view showing an example of the relationship between the shared coordinate and virtual regions generated by respective points.

FIG. 11 is a view showing an example of the relationship between the shared coordinate 500 and virtual regions generated by the respective points. In FIG. 11, a virtual region A 230 indicates that generated by the point A 200, and a virtual region B 330 indicates that generated by the point B 300.

The virtual region A 230 includes a plurality of contents, that is, a conference note 231, document A-0 232, document A-1 233, and camera image A 234 in case of FIG. 11. Also, the virtual region B 330 includes a document B-0 331, document B-1 332, and camera image B 333. A plurality of windows extracted from the virtual regions is respectively associated with the shared coordinate 500.

In case of FIG. 11, the conference note 231 and camera image A 234 are extracted from the virtual region A 230, and the camera image B 333 is extracted from the virtual region B 330 to create the display region 520 in the shared coordinate 500. That is, the display region 520 includes the windows extracted from the virtual regions generated by different systems (points).

With "point A" (display region 510) in the shared coordinate 500, the conference note 231 and document A-0 232 in the virtual region A 230 are associated. With "point B" (display region 530) in the shared coordinate 500, the document B-0 331 and document B-1 332 in the virtual region B 330 are associated.

As described above, since the virtual region A 230 and virtual region B 330 are associated with each other on the shared coordinate 500, the contents in the virtual region A 230 and virtual region B 330 can be displayed on the display units included in the respective points 200 and 300.

Figure 12:
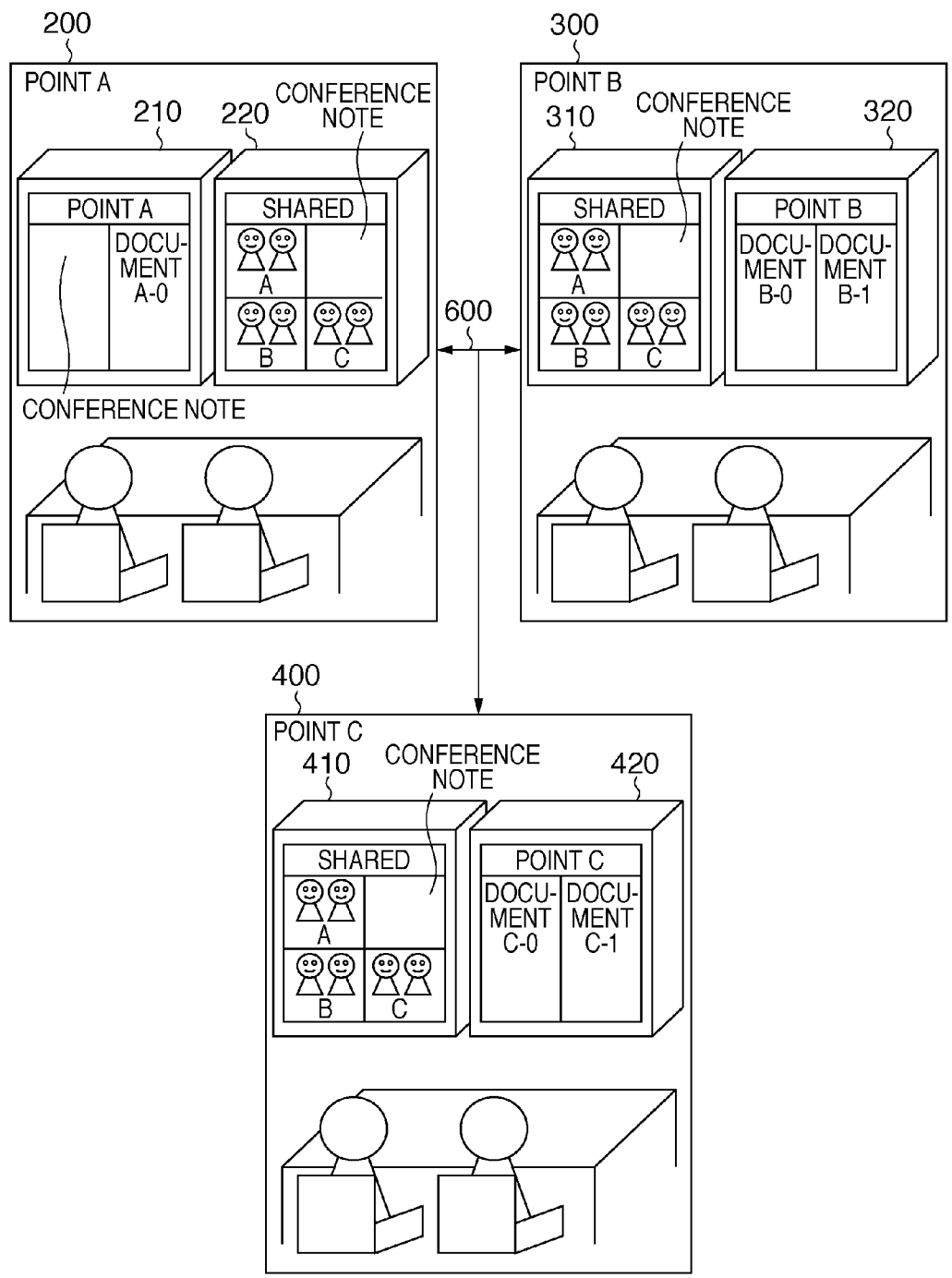
FIG. 12 is a second view showing an example of a video conference system.

FIG. 12 shows an overview of a video conference system in which three points, that is, the point A 200, the point B 300, and a point C 400 are connected via the network 600. That is, in FIG. 12, the new point C 400 is added to the video conference system shown in FIG. 9. In this case, in the point C 400, display units 410 and 420 are arranged. An overview of a case in which the new point C 400 is added in a state in which a conference is conducted between the point A 200 and point B 300 will be described below.

Figure 13:
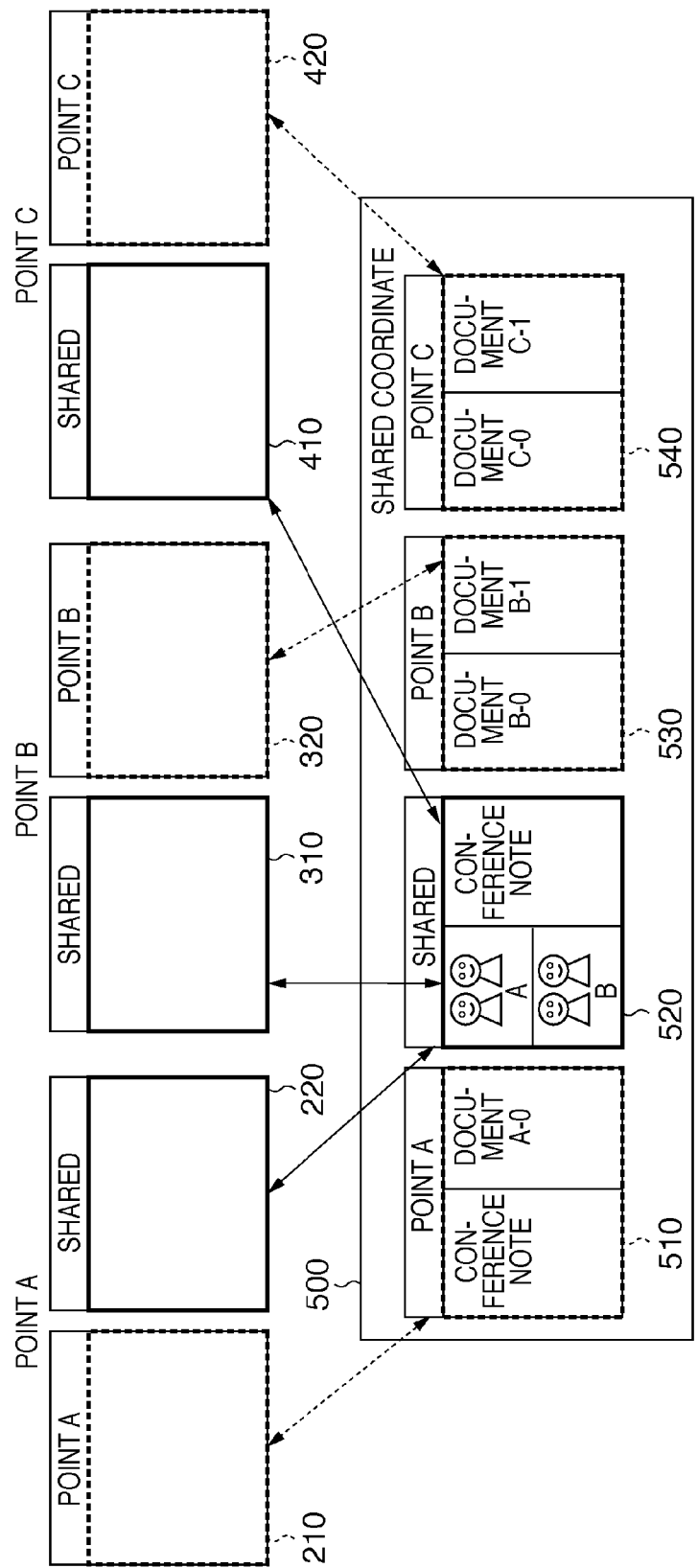
FIG. 13 is a second view showing an example of the relationship between a plurality of display units and the shared coordinate.

FIG. 13 is a view showing an example of the relationship between the plurality of display units 210, 220, 310, 320, 410, and 420 shown in FIG. 12, and the shared coordinate 500.

Reference numeral 500 denotes a shared coordinate shared between the plurality of display units and the plurality of systems (in this case, the points A to C); and 510, 520, 530, and 540, coordinates (display regions) of the respective display units on the shared coordinate 500. In FIG. 13, the display region 520 includes display information shared between the respective points, and corresponds to the display units 220, 310, and 410 of the point A 200, point B 300, and point C 400. The display region 510 includes display information unique to the point A 200, and corresponds to the display unit 210. The display region 530 includes display information unique to the point B 300, and corresponds to the display unit 320. Furthermore, the display region 540 includes display information unique to the point C 400, and corresponds to the display unit 420.

Figure 14:
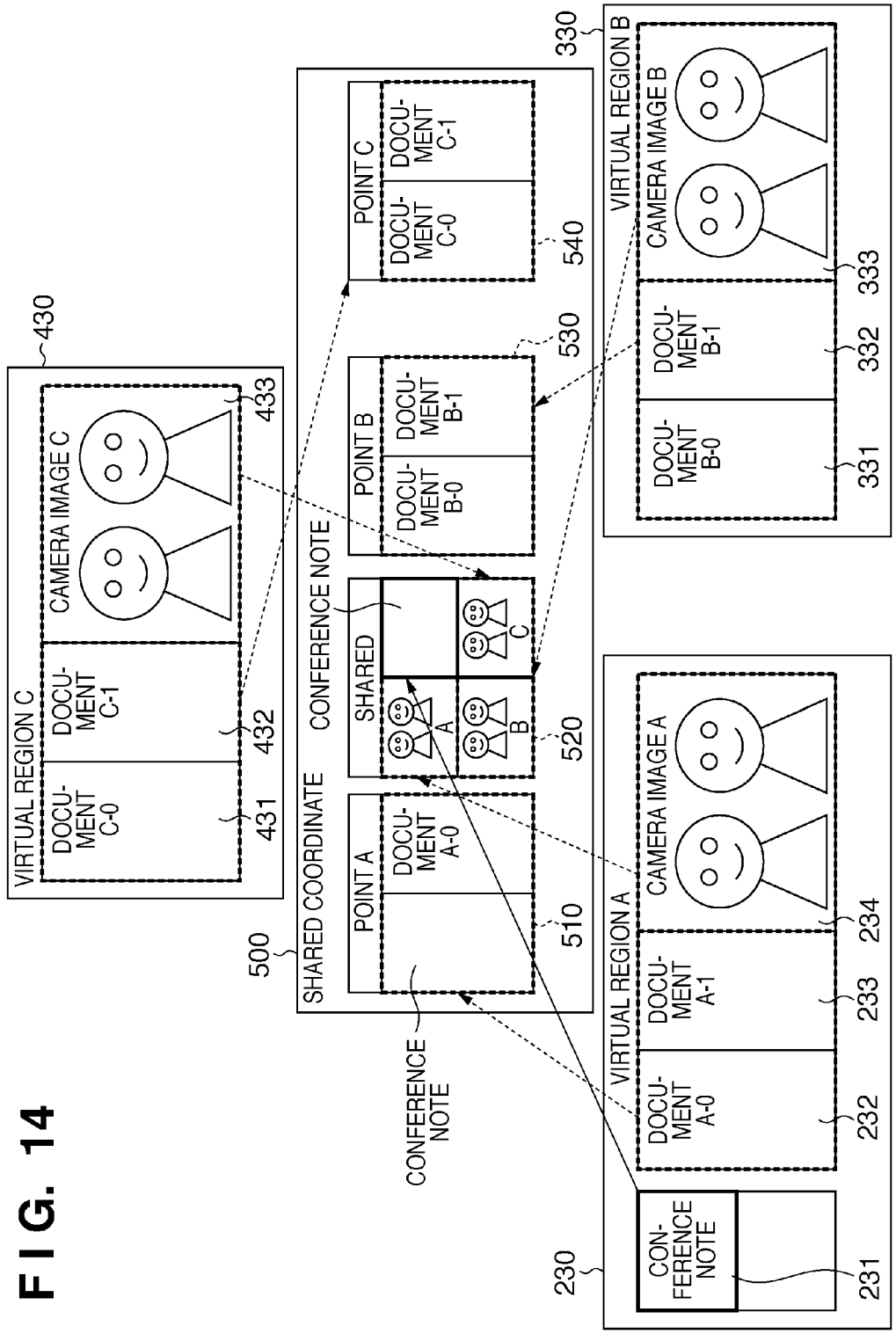
FIG. 14 is a second view showing an example of the relationship between the shared coordinate and virtual regions generated by respective points.

FIG. 14 is a view showing an example of the relationship between the shared coordinate 500 and virtual regions generated by the respective points. In FIG. 14, a virtual region A 230 indicates that generated by the point A 200, a virtual region B 330 indicates that generated by the point B 300, and a virtual region C 430 indicates that generated by the point C 400.

The virtual region A 230 includes a plurality of contents, that is, a conference note 231, document A-0 232, document A-1 233, and camera image A 234 in case of FIG. 14. Also, the virtual region B 330 includes a document B-0 331, document B-1 332, and camera image B 333. Likewise, the virtual region C 430 includes a document C-0 431, document C-1 432, and camera image C 433.

In case of FIG. 14, the conference note 231 and camera image A 234 are extracted from the virtual region A 230, the camera image B 333 is extracted from the virtual region B 330, and the camera image C 433 is extracted from the virtual region C 430 to create the display region 520. That is, the display region 520 includes windows extracted from the virtual regions generated by different systems (points).

The conference note 231 and document A-0 232 in the virtual region A 230 are associated with "point A" (display region 510) in the shared coordinate 500. The document B-0 331 and document B-1 332 in the virtual region B 330 are associated with "point B" (display region 530) in the shared coordinate 500. Furthermore, the document C-0 431 and document C-1 432 in the virtual region C 430 are associated with "point C" (display region 540) in the shared coordinate 500.

As described above, the virtual region A 230, virtual region B 330, and virtual region C 430 are associated with each other on the shared coordinate 500. Then, the contents in the virtual region A 230, virtual region B 330, and virtual region C 430 can be displayed on the display units included in the respective points 200, 300, and 400.

The sequence of processing in the video conference system shown in FIG. 12 will be described below with reference to FIG. 15. In this case, the operation in the point C 400 when the new point C 400 is added in a state in which the conference is conducted between the point A 200 and point B 300 will be described.

When the point C 400 joins the video conference as a new system, it confirms whether information shared by the existing systems is displayed on the display units 410 and 420 of the self system. That is, the point C 400 confirms whether pieces of information from the virtual regions generated by the point A 200 and point B 300 are displayed on the display units 410 and 420.

If the pieces of information shared by other systems are not displayed on the display units 410 and 420 of the self system (NO in step S200), the point C 400 causes the display management unit 20 to arrange display regions corresponding to the display units 410 and 420 on the shared coordinate 500. In this case, the display regions corresponding to the display units 410 and 420 of the self system are arranged at positions (exclusive positions with other systems) where no extracted regions are associated by other systems (points A and B) (S201).

If the pieces of information shared by other systems are displayed on the display units 410 and 420 of the self system (YES in step S200), the point C 400 causes the display management unit 20 to arrange the display regions corresponding to the display units 410 and 420 on the shared coordinate 500. In this case, the display regions corresponding to the display units 410 and 420 of the self system are arranged at positions (shared positions) where the extracted regions are associated by other systems (S202). In the description of FIGS. 12 to 14 above, the display unit 410 displays information shared by other systems, but the display unit 420 does not display any information shared by other systems.

The point C 400 causes the virtual region management unit 30 to generate a virtual region of the self system (S203). That is, the aforementioned virtual region C 430 is generated. The point C 400 causes the content control unit 40 to arrange contents on the generated virtual region (S204).

After that, the point C 400 confirms if it has to request other systems to update information shared by other systems. For example, in the description of FIGS. 12 to 14 above, the point C 400 requests the point A 200 to change the extracted region on the conference note 231 on the virtual region A 230 generated by the point A 200.

If there is no need to request other systems to update information (NO in step S205), the process jumps to step S207; otherwise (YES in step S205), the point C 400 requests other systems to update the extracted regions (S206). Note that updating of the extracted regions includes a change in range of a region to be extracted, and a change in arrangement position of the extracted region on the shared coordinate 500.

After that, the point C 400 causes the extracted region management unit 50 to extract an extracted region from the virtual region of the self system (S207), and to associate that region with the shared coordinate 500 (S208).

As described above, according to the second embodiment, even when the point C 400 is added from a video conference between the two points, that is, the point A 200 and point B 300, the display region and extracted region associated with the point C can be arranged on the shared coordinate 500.

Typical embodiments of the present invention have been described above. However, the present invention is not limited to the aforementioned and illustrated embodiments, and can be properly modified without departing from the scope of the invention.

The present invention can adopt embodiments in the forms of, for example, a system, apparatus, method, program, and storage medium. The present invention may be applied to either a system constituted by a plurality of devices, or an apparatus consisting of a single device.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

According to the present invention, display apparatuses and contents can be easily shared between a plurality of systems.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-189040 filed on Jul. 22, 2008, which is hereby incorporated by reference herein in its entirety.

What is claimed is:

1. A sharing display processing system comprising:
a plurality of display processing systems including a first display processing system and a second display processing system;
a content arrangement unit configured to arrange, on a shared memory region shared among the first and second display processing systems, a first extraction region extracted from a first virtual region in which a first content is arranged and a second extraction region extracted from a second virtual region in which a second content is arranged;
a display region arrangement unit configured to arrange, on the shared memory region, a first display region for the first display processing system and a second display region for the second display processing system independently of arrangement of the first and second extraction regions; and
a display control unit configured to control a first display unit of the first display processing system to display content included in the first display region and to control a second display unit of the second display processing system to display content included in the second display region.

2. The system according to claim 1, wherein said display region arrangement unit arranges, on the shared memory region, the first and second display regions independently of the sizes and arrangement positions of the first and second extraction regions.

3. A first display processing apparatus, comprising:
a content arrangement unit configured to arrange, on a shared memory region shared among said first display processing apparatus and a second display processing apparatus, a first extraction region extracted from a first virtual region in which a first content is arranged and a second extraction region extracted from a second virtual region in which a second content is arranged;
a display region arrangement unit configured to arrange, on the shared and memory region, a first display region for the first display processing apparatus and a second display region for the second display processing apparatus independently of arrangement of the first and second extraction regions; and
a display control unit configured to control a first display unit of the first display processing apparatus to display content included in the first display region, wherein content included in the second display region is displayed on a second display unit of the second display processing apparatus which is connected to the first display processing apparatus.

4. The apparatus according to claim 3, further comprising:
a requesting unit configured to request the other display processing apparatus to update a region on the memory region on which content stored by the other display processing apparatus is arranged, when the first display unit displays content stored by the other display processing apparatus.

5. The apparatus according to claim 3, further comprising:
a selection unit configured to select a part of content among content stored in the display processing apparatus;
wherein the selected part of content is arranged on the memory region by the content arrangement unit.

6. The apparatus according to claim 3, further comprising:
a display region arrangement unit configured to arrange the first display region on the memory region.

7. The apparatus according to claim 3, further comprising:
a display region arrangement unit configured to arrange the first display region on the memory region based on display size information indicating a display size of the first display unit.

8. The apparatus according to claim 3, wherein said display region arrangement unit arranges, on the shared memory region, the first and second display regions independently of the sizes and arrangement positions of the first and second extraction regions.

9. A display method in a sharing display processing system comprising:
arranging, on a memory region shared among first and second display processing systems of the sharing display processing system, a first extraction region extracted from a first virtual region in which a first content is arranged and a second extraction region extracted from a second virtual region in which a second content is arranged;
arranging, on the shared memory region, a first display region for the first display processing system and a second display region for the second display processing system independently of arrangement of the first and second extraction regions;

controlling a first display unit of the first display processing system to display content included in the first display region; and controlling a second display unit of the second display processing system to display content included in the second display region.

10. The method according to claim 9, further comprising:
selecting a part of content among content stored in the display processing apparatus;
wherein the selected part of content is arranged on the memory region.

11. The method according to claim 9, wherein, on the shared memory region, the first and second display regions are arranged independently of the sizes and arrangement positions of the first and second extraction regions.

12. A method in a first display processing apparatus, comprising:
arranging, on a memory region shared among said first display processing apparatus and a second display processing apparatus, a first extraction region extracted from a first virtual region in which a first content is arranged and a second extraction region extracted from a second virtual region in which a second content is arranged;

arranging, on the shared memory region, a first display region for the first display processing apparatus and a second display region for the second display processing apparatus independently of arrangement of the first and second extraction regions; and controlling a first display unit of the first display processing apparatus to display content included in the first display region, wherein content included in the second display region is displayed on a second display unit of the second display processing apparatus which is connected to the first display processing apparatus.

13. A non-transitory computer-readable storage medium for storing a program that causes a display processing apparatus to execute the method according to claim 12.

14. The method according to claim 12, wherein, on the shared memory region, the first and second display regions are arranged independently of the sizes and arrangement positions of the first and second extraction regions.

* * * * *